United States Patent [19]
Hanada et al.

[11] Patent Number: 6,143,419
[45] Date of Patent: Nov. 7, 2000

[54] INK-JET RECORDING SHEET COMPRISING A MOLECULE CONTAINING TERTIARY AMINO GROUPS AND POLYSILOXANE SEGMENTS

[75] Inventors: Kazuyuki Hanada; Motoaki Umezu; Kenichi Takahashi; Katsutoshi Torii; Takeshi Kawaguchi; Katsuyuki Fukui, all of Tokyo, Japan

[73] Assignees: Dainichiseika Color & Chemicals Mfg. Co., Ltd.; Ukima Colour & Chemicals Mfg. Co., Ltd., both of Tokyo, Japan

[21] Appl. No.: 09/084,314

[22] Filed: May 26, 1998

[30] Foreign Application Priority Data

Dec. 25, 1997 [JP] Japan .................................. 9-366265
Dec. 25, 1997 [JP] Japan .................................. 9-366266

[51] Int. Cl.$^7$ ...................................................... B23B 9/04
[52] U.S. Cl. .......................................... 428/447; 428/195
[58] Field of Search ...................... 346/135.1; 428/41.8, 428/42.1, 145, 19.5, 211, 212, 332, 334, 343, 352, 3.54, 447

[56] References Cited

U.S. PATENT DOCUMENTS 5,101,218  3/1992  Sakaki et al. ........................... 346/1.1
5,384,365  1/1995  Hanada et al. .......................... 525/105

FOREIGN PATENT DOCUMENTS 349141  3/1994  European Pat. Off.  ......... B41M 5/26

*Primary Examiner*—Bruce H. Hess
*Assistant Examiner*—Michael E. Grendzynski
*Attorney, Agent, or Firm*—Oblon, Spivak, McClelland, Maier & Neustadt, P.C.

[57] ABSTRACT

An ink-jet recording sheet is provided with at least one ink-receiving layer on at least one side of a base material sheet. A resin component which constitutes the ink-receiving layer comprises a hydrophilic resin containing tertiary amino groups in a molecule thereof or a hydrophilic resin containing tertiary amino groups and polysiloxane segments in a molecule thereof. A coating formulation suitable in use for the production of the ink-jet recording sheet is also disclosed.

17 Claims, No Drawings

INK-JET RECORDING SHEET COMPRISING A MOLECULE CONTAINING TERTIARY AMINO GROUPS AND POLYSILOXANE SEGMENTS

BACKGROUND OF THE INVENTION a) Field of the Invention

This invention relates to an ink-jet recording sheet (hereinafter simply called "a recording sheet"), and more specifically to a recording sheet having an ink receiving layer—which imparts excellent waterproofness and moisture resistance to printed characters, pictures, patterns or the like (hereinafter collectively called "printed marks" for the sake of brevity), is excellent in ink absorbency and ink-color-producing ability, provides stable printed marks of high quality, and is also outstanding in the transportability and blocking resistance inside a printer—and also to a coating formulation for producing the sheet.

b) Description of the Related Art

Ink-jet recording is to perform recording of an image, characters or the like by causing tiny droplets of an ink to fly and stick on a recording sheet made of paper or the like. Various operation principles have been proposed including, for example, the electrostatic attraction method, the method that mechanical vibrations or displacements are applied to an ink by means of a piezoelectric element, and the method that an ink is heated to bubble and the resulting pressure is used. As a recording method which permits high-speed recording, produces less noise and enables high-quality printing and multicolor printing, ink-jet recording is finding ever-increasing utility for various applications.

For use in such ink-jet recording, various recording sheets have been proposed, including recording sheets provided on paper or like bases with ink-receiving layers, which are composed primarily of various pigments and resins, or recording sheets containing porous pigments incorporated in themselves upon making paper so that prompt absorption of ink and formation of well-defined ink dots can be assured without a reduction in print quality due to blotting and/or bleeding of the ink adhered on the recording sheets.

For example, JP Kokai No. 57-82085 discloses a recording sheet which has an ink-receiving layer composed of a water-soluble resin and containing an inorganic pigment and an organic pigment, and JP Kokai No. 62-268682 discloses a recording layer which carries an ink-receiving layer composed of a silanol-containing polyvinyl alcohol copolymer and containing fine powdery silica.

However, keeping the step with improvements in the performance of ink-jet recording machines, such as high-speed recording, high-density recording and full-color recording, and the resulting expansion of their application fields, it has also become necessary for recording sheets to have high-level characteristics such as:

(1) Prompt ink absorption and large ink absorption capacity.
(2) High color-producing ability for inks.
(3) High surface strength on the ink-receiving layer.
(4) High waterproofness of the base material so that the base material will not develop roughness or curling by adhered ink.
(5) Good mark storability, such as waterproofness and ozone resistance, after printing of marks on the ink-receiving layer.
(6) No quality changes of the ink-receiving layer along the passage of time.

To meet these requirements, it has been proposed or studied to use a porous pigment or water-soluble polymer having excellent ink absorbency as a component of an ink-receiving layer to be placed on a recording sheet, to use a latex for an improvement in the waterproofness of an ink-receiving layer, and to use as a base material itself a synthetic paper sheet, plastic sheet or the like equipped with waterproofness.

However, those making use of paper as a base material or a water-soluble resin alone as an ink-receiving layer have poor waterproofness at their ink-receiving layers, leading to a drawback in that blotting takes place at parts printed with ink and marks so formed are hence inferior in definition. On the other hand, recording sheets making use of a synthetic paper sheet or plastic film as a base material and those making use of a latex as a resin for the formation of an ink-receiving layer involve problems in the adhesion between the ink-receiving layer and the base material, the ink absorbency of the ink-receiving layer and the drying property of applied ink.

To improve the waterproofness and moisture resistance of printed images of a recording sheet, it has been the general practice to arrange a protective layer over an ink-receiving layer or to add a mordant or the like in an ink-receiving layer. As a method for the arrangement of a protective layer, a hydrophobic resin may be coated or a film may be laminated over an ink-receiving layer after printing images thereon. Although such a method can bring about improvements in waterproofness and moisture resistance, it requires many steps and therefore is not preferred for the formation of images from the standpoint of price. Concerning the method which features the addition of a mordant or the like in an ink-receiving layer, dyes employed in ink-jet color inks are direct dyes or acid dyes, the molecule of each of which contains an anionic carboxyl or sulfonic group. To improve the waterproofness and fixability of images formed with these dyes, a cationic mordant or the like is added to an ink-receiving layer. The bonding between the mordant and its associated dye is however ionic bonding, which is prone to dissociation in the present of water. A limitation is therefore imposed on the waterproofness and moisture resistance of images so formed.

SUMMARY OF THE INVENTION

With a view to solving such problems of the conventional recording sheets as described above and developing a recording sheet which is excellent in the waterproofness and moisture resistance of printed marks to be formed, is superb in ink absorbency and ink-color-producing ability, provides stable printed marks of high quality, and is also outstanding in the transportability and blocking resistance inside a printer, the present inventors have proceeded with a variety of investigations. As a result, it has been found the above object can be achieved by forming an ink-receiving layer of a recording sheet with a particular hydrophilic resin, leading to the completion of the present invention.

Accordingly, there is provided, in one aspect of the present invention, an ink-jet recording sheet provided with at least one ink-receiving layer on at least one side of a base material sheet, wherein a resin component which constitutes the ink-receiving layer comprises a hydrophilic resin containing tertiary amino groups in a molecule thereof. In another aspect of the present invention, there is also provided an ink-jet recording sheet provided with at least one ink-receiving layer on at least one side of a base material sheet, wherein a resin component which constitutes the ink-receiving layer comprises a hydrophilic resin containing tertiary amino groups and polysiloxane segments in a molecule thereof.

DETAILED DESCRIPTION OF THE INVENTION AND PREFERRED EMBODIMENTS

This invention will next be described in further detail by describing certain preferred embodiments.

The ink-jet recording sheet according to the first aspect of the present invention is characterized in that the at least one ink-receiving layer arranged on the at least one side of the base material sheet has been formed by using the hydrophilic resin which contains the tertiary amino groups in the molecule thereof.

The ink-jet recording sheet according to the second aspect of the present invention is characterized in that the at least one ink-receiving layer arranged on the at least one side of the base material sheet is formed of the hydrophilic resin which contains the tertiary amino groups and the polysiloxane segments in the molecule thereof.

The term "hydrophilic resin" as used herein means a polymer which is insoluble in water, warm water or the like although it contains hydrophilic groups in its molecule. The hydrophilic resin should therefore be distinguished from water-soluble resins such as polyvinyl alcohol, polyvinyl pyrrolidone and cellulose derivatives.

In the hydrophilic resins useful in the first and second aspects of the present invention, it is believed that ionic bonds are formed between molecules of a dye and the resins owing to the tertiary amino groups introduced in the resin molecules, resulting in improvements in the fixability of the dye and the waterproofness of marks to be formed.

Taking into consideration that the bonding between the dye and the tertiary amino groups is ionic bonding as in the conventional cases which use a mordant in ink-receiving layers, it is not certain why the marks so formed are equipped with such improved waterproofness over those available by the conventional art. It is however presumed that the resins useful in the present invention are hydrophilic but are water-insoluble and accordingly, that their molecules also contain hydrophobic segments in abundance. Subsequent to the formation of ionic bonds between the tertiary amino groups in the resins and the dye, the hydrophobic segments appear to surround these ionic bonds so that the thus-formed marks are provided with the improved waterproofness over the prior art.

Different from the conventional art making use of a mordant, it is believed that, while the tertiary amino groups in resin molecules in the present invention are progressively forming ionic bonds with the dye, the hydrophobic segments in the resin molecules act to surround these ionic bonds and that this action is attributable to the improved waterproofness of the thus-formed marks.

In the second aspect of the present invention, on the other hand, the polysiloxane segments introduced in the resin molecule is basically hydrophobic (water-repellant) so that, basically speaking, the use of the resin, which contains the segments, in the formation of the ink-receiving layer should not make it possible to expect good results in connection with the absorption of a water-based ink.

It is however known that the surface of an ink-receiving layer made of a hydrophilic resin, which contains polysiloxane segments in a specific proportion range, is fully covered with polysiloxane segments in a dry state but, when the ink-receiving layer is dipped in water or the like, the resin shows a phenomenon that the polysiloxane segments are buried within the resin, in other words, the resin has environmental responsibility [Kobunshi Ronbunshu (see Collected Papers on Polymers), 48[4], 227 (1991); etc.].

In the second aspect of the present invention, this phenomenon is used. The formation of an ink-receiving layer with the above-described hydrophilic resin, which contains polysiloxane segments, makes it possible to provide a recording sheet having good ink absorbency in contrast to an expectation, capable of imparting good waterproofness to marks to be formed, and also capable of exhibiting good transportability inside a printer. Namely, the adequate control of the content of polysiloxane segments in resin molecules has made it possible to provide a recording sheet excellent in surface lubricity, waterproofness, the transportability and blocking resistance in printers, and the like owing to the environmental responsibility, because upon being printed with a water-based ink, the surface of its ink-receiving layer shows hydrophilicity and the polysiloxane segments in the hydrophilic resin act to embrace a dye bonded with the resin molecules through ionic bonding between tertiary amino groups introduced in the molecules of the hydrophilic resin and the ink but, during and after drying subsequent to the recording with the water-based ink, the surface of the ink-receiving layer is covered with the polysiloxane segments.

As the hydrophilic resin for use in the present invention, a hydrophilic resin containing tertiary amino groups in a molecule thereof and a hydrophilic resin containing tertiary amino groups and polysiloxane segments in a molecule thereof are both usable. Illustrative examples of usable resins can include hydrophilic polyurethane resins, hydrophilic polyurea resins, hydrophilic polyurethane-polyurea resins, hydrophilic polyamide resin, hydrophilic polyester resins, hydrophilic acrylic resins and hydrophilic epoxy resins, all of which contain such groups as mentioned above. Among these, preferred hydrophilic resins are hydrophilic polyurethane resins, hydrophilic polyurea resins, hydrophilic polyurethane-polyurea resins and hydrophilic polyamide resins.

In the first aspect of the present invention, no particular limitation is imposed on the method for introducing tertiary amino groups into molecules of the hydrophilic resin to be used. Illustrative can however be to use a compound, which contains one or more tertiary amino groups therein, as a part of raw materials or to react functional groups in the above-described hydrophilic resin free of tertiary amino groups with a tertiary amino compound having reactivity upon synthesis (polymerization) of various hydrophilic resins such as those described above.

In the second aspect of the present invention, no particular limitation is imposed on the production process of the hydrophilic resin containing tertiary amino groups and polysiloxane segments in its molecule. Examples of the process can however include to react a hydrophilic resin free of such tertiary amino groups and polysiloxane segments with a tertiary-amino-group containing reactive compound and a reactive polysiloxane compound to introduce tertiary amino groups and polysiloxane segments into the resin; to synthesize a reactive resin by using a tertiary-amino-group-containing compound as a part of raw material components for a hydrophilic resin, followed by a reaction between the resin and a reactive polysiloxane compound so that polysiloxane segments are introduced into the resin; and to use a tertiary-amino-group-containing compound and a polysiloxane-segment-containing compound as parts of raw material components for a hydrophilic resin and to copolymerize these compounds with the remaining raw material component or components to synthesize the target resin. Taking into consideration the number of steps required for the synthesis of the resin, it is preferred to synthesize the hydrophilic resin by polymerization while using a tertiary-amino-group-containing compound and a polysiloxane-segment-containing compound as parts of the raw materials.

A description will hereinafter be made about raw material components upon production of a hydrophilic resin, which is to be used in the present invention, by a polymerization reaction, a post-polymerization reaction or the like.

Firstly, the compound, which is employed for the introduction of tertiary amino groups into resin molecules in the first and second aspects of the present invention, is a compound containing one or more reactive groups, for example, amino, epoxy, hydroxyl, mercapto, carboxyl, alkoxy, acid halide, carboxyl ester, acid anhydride or like groups in its molecule and also one or more tertiary amino groups in the molecule.

Preferred examples of tertiary amino compounds having such reactive groups therein can include compounds represented by the following formulas (1)–(3), respectively.

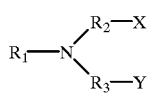
(1)

wherein $R_1$ represents an alkyl group having 20 or fewer carbon atoms, an alicyclic group, or an aromatic group which may contain one or more substituents such as halogen atoms or alkyl groups; $R_2$ and $R_3$ may be the same or different and individually represent lower alkylene groups or lower alkylene groups each of which contains therein a connecting group such as —O—, —CO—, —COO—, —NHCO—, —S—, —SO— or —SO$_2$—; and X and Y may be the same or different and individually represent —OHs, —COOHs, —NH$_2$s, —NHR$_1$s, —SHs or the like or epoxy, alkoxy, acid halide, acid anhydride or carboxyl ester groups which can be converted into —OHs, —COOHs, —NH$_2$s, —NHR$_1$s, —SHs or the like.

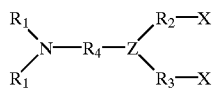
(2)

wherein $R_1$s, $R_2$, $R_3$, X and Y have the same meanings as defined above, and the two $R_1$s may together form a cyclic structure; $R_4$ represents —(CH$_2$)$_n$—, n being an integer of from 0 to 20, or is the same as $R_2$ or $R_3$; and Z represents CH or N.

(3)

wherein X and Y have the same meanings as defined above; and W represents a nitrogen-containing heterocyclic group, a nitrogen- and oxygen-containing heterocyclic group, or a nitrogen- and sulfur-containing heterocyclic group.

Specific examples of compounds represented by the above formulas (1) to (3) can include:

N,N-dihydroxyethyl-methylamine,
N,N-dihydroxyethyl-ethylamine,
N,N-dihydroxyethyl-isopropylamine,
N,N-dihydroxyethyl-n-butylamine,
N,N-dihydroxyethyl-t-butylamine,
methyliminobispropylamine,
N,N-dihydroxyethylaniline,
N,N-dihydroxyethyl-m-toluidine,
N,N-dihydroxyethyl-p-toluidine,
N,N-dihydroxyethyl-m-chloroaniline,
N,N-dihydroxyethylbenzylamine,
N,N-dimethyl-N',N'-dihydroxyethyl-1,3-diaminopropane,
N,N-diethyl-N',N'-dihydroxyethyl-1,3-diaminopropane,
N-hydroxyethyl-piperazine,
N,N'-dihydroxyethyl-piperazine,
N-hydroxyethoxyethyl-piperazine,
1,4-bisaminopropyl-piperazine,
N-aminopropyl-piperazine,
dipicolinic acid,
2,3-diaminopyridine,
2,5-diaminopyridine,
2,6-diaminopyridine,
2,6-diamino-4-methylpyridine,
2,6-dihydroxypyridine,
2,6-pyridine-dimethanol,
2-(4-pyridyl)-4,6-dihydroxypyrimidine,
2,6-diaminotriazine,
2,5-diaminotriazole, and
2,5-diaminooxazole.

Ethylene oxide adducts, propylene oxide adducts and the like of these tertiary amino compounds are also usable in the present invention. Illustrative of such adducts can be the following compounds:

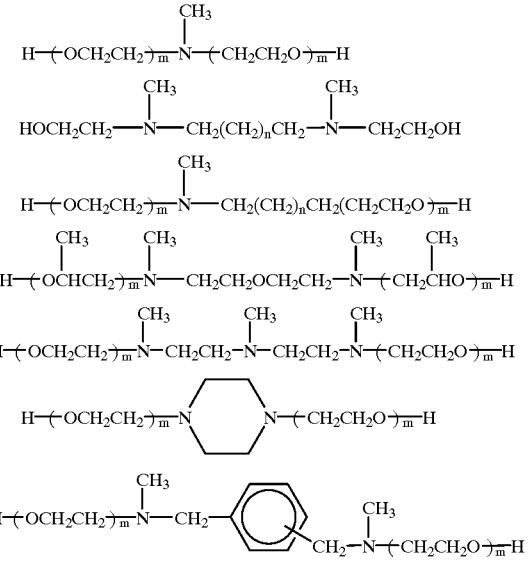

wherein m stands for an integer of from 1 to 60, and n stands for an integer of from 1 to 6.

A polysiloxane compound, which is usable for the introduction of polysiloxane segments into molecules of the hydrophilic resin in the second aspect of the present invention, contains one or more reactive groups, for example, amino, epoxy, hydroxyl, mercapto, carboxyl or like groups in its molecule. Preferred examples of the polysiloxane compound containing such reactive groups can include the following compounds:

(1) Amino-modified Polysiloxane Compounds

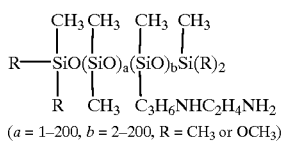
($a = 1$–200, $b = 2$–200, R = $CH_3$ or $OCH_3$)

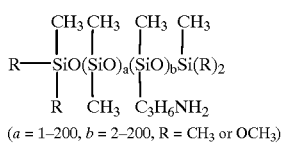
($a = 1$–200, $b = 2$–200, R = $CH_3$ or $OCH_3$)

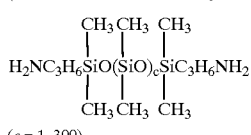
($c = 1$–300)

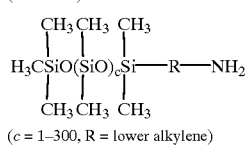
($c = 1$–300, R = lower alkylene)

(2) Epoxy-modified Polysiloxane Compounds

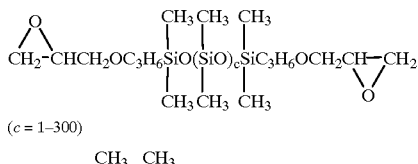
($c = 1$–300)

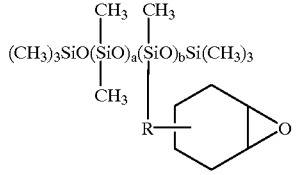
($a = 1$–200, $b = 2$–200, R = lower alkylene)

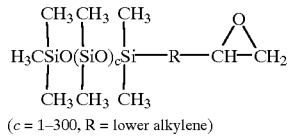
($c = 1$–300, R = lower alkylene)

(3) Alcohol-modified Polysiloxane Compounds

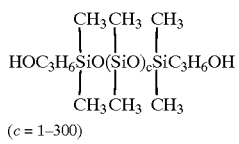
($c = 1$–300)

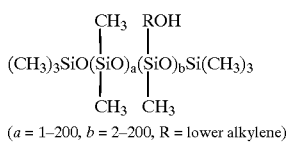
($a = 1$–200, $b = 2$–200, R = lower alkylene)

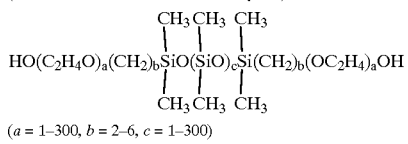
($a = 1$–300, $b = 2$–6, $c = 1$–300)

-continued

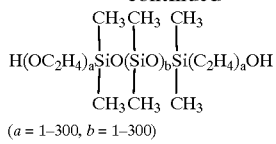
($a = 1$–300, $b = 1$–300)

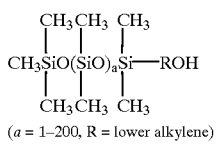
($a = 1$–200, R = lower alkylene)

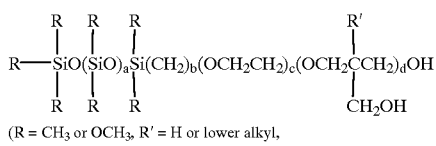
(R = $CH_3$ or $OCH_3$, R′ = H or lower alkyl,
$a = 1$–300, $b = 0$–5, $c = 0$–50, $d = 1$–3)

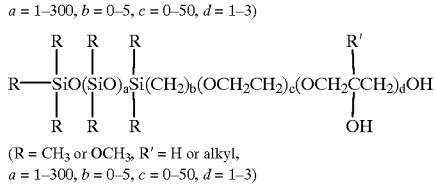
(R = $CH_3$ or $OCH_3$, R′ = H or alkyl,
$a = 1$–300, $b = 0$–5, $c = 0$–50, $d = 1$–3)

(4) Mercapto-modified Polysiloxane Compounds

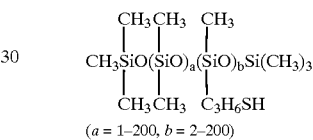
($a = 1$–200, $b = 2$–200)

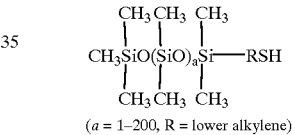
($a = 1$–200, R = lower alkylene)

(5) Carboxyl-modified Polysiloxane Compounds

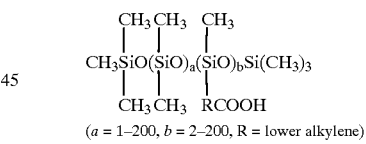
($a = 1$–200, $b = 2$–200, R = lower alkylene)

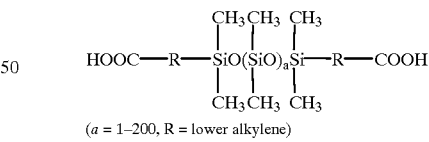
($a = 1$–200, R = lower alkylene)

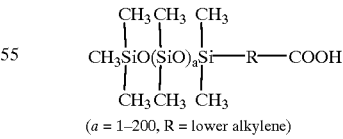
($a = 1$–200, R = lower alkylene)

Among the above-described polysiloxane compounds, the polysiloxanepolyols and the polysiloxanepolyamines are particularly useful.

The hydrophilic resin useful in the present invention, especially the preferred hydrophilic polyurethane resin, hydrophilic polyurea resin, hydrophilic polyurethane-polyurea resin or hydrophilic polyamide resin can be synthesized in accordance with a conventionally-known resin synthesis (polymerization) process by using, as a part or parts of synthesis raw materials, the above-described tertiary amino compound in the first aspect of the present invention or the above-described tertiary amino compound and the above-described reactive-group-containing polysiloxane compound, but no particular limitation is imposed on the polymerization process. A description will hereinafter be made specifically about preferred synthesis processes.

Other raw material components, which are preferred for the provision of hydrophilic resins useful in the present invention by copolymerization with the one raw material component (the tertiary amine compound) or the two raw material components (the tertiary amine and the reactive-group-containing polysiloxane compound), are raw material components employed as raw materials for conventional polyurethane resins, polyurea resins, polyurethane-polyurea resins or polyamide resins. For example, compounds each of which contains a hydroxyl group, amino group, carboxyl group or the like as an end group and has a molecular weight in a range of from 100 to 8,000 are usually employed.

Illustrative of compounds containing hydroxyl groups as end groups and having hydrophilicity are:

polyethylene glycol, copolymerized polyol of polyethylene glycol and polytetramethylene glycol, copolymerized polyol of polyethylene glycol and polypropylene glycol, polyethylene glycol adipate, polyethylene glycol succinate, copolymerized polyol of polyethylene glycol and poly-ε-caprolactone, and copolymerized polyol of polyethylene glycol and poly-γ-valerolactone.

Illustrative of compounds containing amino groups as end groups and having hydrophilicity are:

polyethylene oxide diamine, polyethylene oxide propylene oxide diamine, polyethylene oxide triamine, and polyethylene oxide propylene oxide triamine.

Besides the above-described compounds, ethylene oxide adducts containing carboxyl groups or vinyl groups and like compounds can also be used. One or more of other polyols, polyamines and polycarboxylic acid compound having no hydrophilicity can also be used in combination with the above-described raw material components in order to impart other property or properties.

The preferable weight average molecular weight of the hydrophilic resin containing tertiary amino groups in its molecule and employed in the first aspect of the present invention and that of the hydrophilic resin containing tertiary amino groups and polysiloxane segments in its molecule and employed in the second aspect of the present invention, both of said resins being available from materials such as those described above, may range from about 5,000 to 500,000 or so, with a weight average molecular weight of from 100,000 to 200,000 being more preferred.

When these resins are each synthesized by a polymerization reaction of the above-described raw material components, they can be either those synthesized in a solventless manner or those synthesized in water or an organic solvent. From the standpoint of production steps, production of the resin in an organic solvent, which is usable upon formation of an ink-receiving layer, or in water is advantageous because the resulting resin solution can be used as is for the formation of the ink-receiving layer.

The tertiary amino groups in each hydrophilic resin for use in the present invention may be contained in either one or both of its side chains (pendants) and its back bone. The content of the tertiary amino groups in the resin may preferably be in a range of from 1 to 60 wt. %, in terms of the tertiary amino compound as the raw material, of the whole resin. If the content of the tertiary amino compound is smaller than the above range, an ink-receiving layer cannot fully exhibit waterproofness, moisture resistance and the like, the attainment of which is an objective of the present invention. On the other hand, a content of the tertiary amino compound higher than the above range leads to an ink-receiving layer having stronger water repellency due to a reduction in the proportion of hydrophilic segments, and hence to deteriorations in the absorbency of a water-based ink and the quality of printed marks. Contents of the tertiary amino compound outside the above range are therefore not preferred.

Further, the number of tertiary amino groups may be from 0.1 to 50 equivalents per gram, preferably from 0.2 to 10.0 equivalents per gram, in other words, may be from 1 to 50 groups, preferably from 2 to 5 groups per 1,000 weight average molecular weight of the hydrophilic resin. If the number of tertiary amino groups is smaller than the above range, the fixability of a dye, the waterproofness of formed marks, and the like properties are insufficient. If the number of tertiary amino groups is greater than the above range, on the other hand, the resulting resin is provided with stronger water repellency due to a reduction in the proportion of hydrophilic segments in the resin, raising a problem in the ink absorbency or the like of an ink-receiving layer to be formed.

In the second aspect of the present invention, the polysiloxane segments in the resin may also be contained in either one or both of its side chain (pendants) and its backbone. The content of the segments in the resin may be in a range of from 0.1 to 10 wt. %, notably of from 0.5 to 10 wt. % of the whole resin. If the content of the polysiloxane segments in the resin is smaller than 0.1 part by weight, the good surface properties—such as waterproofness, high running property, transportability and blocking resistance—of a recording sheet, the attainment of which is an objective of the present invention, cannot be fully brought about. On the other hand, a content of polysiloxane segments higher than 10 wt. % leads to stronger water repellency for the polysiloxane segments and hence to deteriorations in the absorbency of a water-based ink in an ink-receiving layer to be formed and the quality of printed marks to be formed on the ink-receiving layer. Contents of polysiloxane segments outside the above range are therefore not preferred.

Usable examples of the base material sheets in the recording sheets according to the present invention can include paper sheets, plastic films, glass sheets and the like, although no particular limitation is imposed on the base material sheets. Exemplary paper sheets can include high-quality paper sheets (i.e., wood-free paper sheets), medium-quality paper sheets (i.e., paper sheets made of at least 70% of chemical pulp and the remainder of groundwood pulp), coated paper sheets, and cast-coated paper sheets. Illustrative of plastic films can be polyester, cellulose triacetate, polycarbonate, poly(vinyl chloride), polypropylene, polyamide, polystyrene, polyethylene and poly(methyl methacrylate) sheets of 50–250 μm in thickness. If necessary, these base material sheets can each be provided with a primer layer to improve the adhesion of its ink-receiving layer to the base material sheet and/or can each be provided, on its back side opposite to its ink-receiving layer, with an anti-curling layer or with a lubricant layer which improves the coefficient of friction.

As the resin component constituting the ink-receiving layer, the above-described resins can be used singly. Depending on the composition of an ink to be used in ink-jet recording, each of the above-described resins may also be used in combination with another water-soluble resin with a view to adjusting the hydrophilicity and/or water absorbency of the ink-receiving layer or additionally imparting such property and/or properties to the ink-receiving layer. Usable examples of the water-soluble resin can include polyvinyl alcohol, modified polyvinyl alcohol, hydroxyethylcellulose, CMC, cellulose derivatives, polyvinylpyrrolidone, starch, cationized starch, gelatin, casein, and acrylic acid polymers.

Further, a hydrophobic resin may also be used in combination with the each of the above-described resins with a view to imparting additional waterproofness and durability to the ink-receiving layer and also to printed marks to be formed thereon. Usable examples of the hydrophobic resin can include polyester resins, poly(vinyl chloride) resin, polystyrene resin, poly(methyl methacrylate) resin, polycarbonate resins, polyurethane resins, vinyl chloride-vinyl acetate copolymer resins, acrylonitrile-styrene copolymer resins, polyvinyl butyral resin, polyamide resins, epoxy resins, urea resins, and melamine resins.

Moreover, one or more inorganic or organic pigments and/or resin particles can also be incorporated in the ink-receiving layer in order to provide the ink-receiving layer with improved ink absorbency, dye fixability, dye-color-producing ability, blocking resistance and waterproofness. As such pigments and resin particles, one or more pigments and resin particles can be suitably chosen in accordance with the quality design of the recording sheet from known pigments and resin particles, for example, mineral or porous pigments—such as kaolin, delaminated kaolin, aluminum hydroxide, silica, diatomaceous earth, calcium carbonate, talc, titanium oxide, calcium sulfate, barium sulfate, zinc oxide, alumina, calcium silicate, magnesium silicate, colloidal silica, zeolite, bentonite, sericite and lithopone; fine particles and fine porous particles of plastic pigments composed of polystyrene resin, urea resins, acrylic resins, melamine resins, benzoguanamine resin or polyurethane resins; and hollow particles composed of these materials.

In addition to such resins and pigments, one or more of various other additives can also be incorporated in the ink-receiving layer as needed. These additives can include thickening agents, parting agents, penetrating agents, wetting agents, thermal gelling agents, sizing agents, defoaming agents, foam suppressors, blowing agents, coloring matters, fluorescent whiteners, ultraviolet absorbers, oxidation inhibitors, quenchers, antiseptic agents, antistatic agents, crosslinking agents, dispersants, lubricants, plasticizers, pH regulators, flow improvers, setting promoters, and waterproofing agents.

A description will next be made about the formation of an ink-receiving layer. First, a hydrophilic resin containing tertiary amino groups in its molecule or a hydrophilic resin containing tertiary amino groups and polysiloxane segments in its molecule is dissolved or dispersed either by itself or, if necessary, together with one or more other resins in one of various organic solvents or in water and, if necessary, one or more of the above-described pigments, resin particles and various additives may then added and mixed, whereby a coating formulation is prepared. Examples of the solvent usable for the preparation of the coating formulation can include water (in this case, the coating formulation is obtained in the form of a dispersion or an emulsion), methanol, ethanol, propanol, acetone, methyl ethyl ketone, toluene, xylene, ethyl acetate, ethyl butyrate, dioxane, pyrrolidone, dimethylformamide, formamide and dimethylsulfoxide; and mixtures thereof. The concentration of the above-described hydrophilic resin in the coating formulation may range generally from about 5 to 50 wt. %, preferably from about 10 to 30 wt. %. Further, the viscosity of the coating formulation may range from about 1 to 500 dPa.s, preferably from about 10 to 200 dPa.s in view of coating applicability. One or more of the various pigments may be added generally in a total amount of from 0 to 5 parts by weight, preferably in a total amount of from about 0.5 to 20 parts by weight per 100 parts by weight of the hydrophilic resin.

Illustrative of a coating method of the coating formulation on the base material sheet can be gravure coating, direct or reverse roll coating, wire bar coating, air knife coating, curtain coating, blade coating, rod coating, and die coating. The recording sheet according to the present invention can be obtained by applying the coating formulation on at least one side of the base material sheet to give a predetermined dry thickness and then drying the thus-applied coating formulation. After the application of the coating formulation, surface finishing may be applied by using a calender such as a machine calender, supercalender or soft calender.

The coating weight of the above coating formulation may be generally from 0.5 to 50 $g/m^2$ or so, preferably from 3 to 30 $g/cm^2$ or so in terms of dry weight. If the coating weight is smaller than 0.5 $g/m^2$, the resulting ink-receiving layer cannot exhibit sufficient ink absorbency. Even if the coating weight exceeds 50 $g/m^2$, the effects of the present invention are not exhibited to greater extents. Accordingly, such an excessively large coating weight is not economical and, moreover, tends to induce folding, cracking, curling and the like on the resulting recording sheet.

The present invention will next be described more specifically by the following Referential Examples, Examples and Comparative Examples, in which all the designations of "part" or "parts" and "%" are by weight unless otherwise specifically indicated.

(1) First Aspect of the Invention

Referential Example 1
(Synthesis Example of Polyurethane Resin)

In a reactor, 150 parts of polyethylene glycol (molecular weight: 2,040), 20 parts of N-methyldiethanolamine and 5 parts of ethylene glycol were dissolved in a mixed solvent consisting of 150 parts of methyl ethyl ketone and 210 parts of dimethylformamide. While thoroughly stirring the solution at 60° C., a solution of 74 parts of hydrogenated MDI in 100 parts of methyl ethyl ketone was gradually added dropwise. After completion of the dropwise addition, they were reacted at 80° C. for 6 hours so that a polyurethane resin solution useful in the present invention was obtained. This resin solution had a viscosity of 530 dPa.s (25° C.) at a solid content of 35%. The breaking strength, breaking extension and softening point of a film formed from the resin solution were 24.5 MPa, 450% and 115° C., respectively.

Referential Example 2
(Synthesis Example of Polyurea Resin)

In a reactor, 150 parts of polyethylene oxide diamine ("Jeffermin ED", trade name; product of Texaco Chemical Inc.; molecular weight: 2,000), 30 parts of methyliminobispropylamine and 4 parts of 1,4-diaminobutane were dissolved in 200 parts of dimethylformamide. While thoroughly stirring the solution with its internal temperature controlled within a range of from 20 to 30° C., a solution of 83 parts of hydrogenated MDI in 100 parts of dimethylformamide was gradually added dropwise to react them.

After completion of the dropwise addition, the internal temperature was gradually raised. When 50° C. was reached, they were reacted further for 6 hours. Then, 195 parts of dimethylformamide were added, whereby a polyurea resin solution useful in the present invention was obtained. This resin solution had a viscosity of 230 dPa.s (25° C.) at a solid content of 35%. The breaking strength, breaking extension and softening point of a film formed from the resin solution were 27.6 MPa, 310% and 145° C., respectively.

Referential Example 3
(Synthesis Example of Polyurethane-polyurea Resin)

In a reactor, 150 parts of polyethylene oxide diamine ("Jeffermin ED", trade name; product of Texaco Chemical Inc.; molecular weight: 2,000), 30 parts of N,N-dimethyl-N',N'-dihydroxyethyl-1,3-diaminopropane and 6 parts of triethylene glycol were dissolved in 140 parts of dimethylformamide. While thoroughly stirring the solution with its internal temperature controlled within a range of from 20 to 30° C., a solution of 70 parts of hydrogenated MDI in 200 parts of methyl ethyl ketone was gradually added dropwise. After completion of the dropwise addition, the contents were allowed to react at 80° C. for 6 hours. After completion of the reaction, 135 parts of methyl ethyl ketone were added so that a polyurethane-polyurea resin solution useful in the present invention was obtained. The resin solution had a viscosity of 280 dPa.s (25° C.) at a solid content of 35%. The breaking strength, breaking extension and softening point of a film formed from the resin solution were 14.7 MPa, 450% and 107° C., respectively.

Referential Example 4
(Synthesis Example of Polyamide Resin)

To a solution of 14.6 parts of adipic acid in 200 parts of anhydrous ethanol in a reactor, a solution of 120 parts of polyethylene oxide diamine ("Jeffermin ED", trade name; product of Texaco Chemical Inc.; molecular weight: 2,000), 3 parts of methyliminobispropylamine and 2 parts of 1,4-diaminobutane in 100 parts of anhydrous ethanol was added dropwise at room temperature. After exotherm subsided, the reaction mixture was cooled, whereby a nylon salt was allowed to precipitate.

After the nylon salt was collected by filtration and dried, 160 parts of the nylon salt were dissolved in 40 parts of water. The resulting solution was placed in an autoclave. The autoclave was purged with nitrogen gas, and its valve was closed. When the internal temperature and pressure reached 220° C. and 1.5 MPa, respectively, the valve was opened to release water vapor. Heating was continued while maintaining the pressure. Polycondensation was conducted for 4 hours and, after that, the internal pressure was allowed to slowly drop to atmospheric pressure. After cooling, the reaction product was taken out and dissolved in N-methyl-2-pyrrolidone. This resin solution had a viscosity of 50 dPa.s (25° C.) at a solid content of 30%. The breaking strength, breaking extension and softening point of a film formed from the resin solution were 7.8 MPa, 130% and 140° C., respectively.

Referential Example 5
(Synthesis Example of Polyurethane Resin for Use in a Comparative Example)

A polyurethane resin solution was obtained using the same materials and formula as in Referential Example 1 except that N-methyldiethanolamine was not used. This resin solution had a viscosity of 500 dPa.s (25° C.) at a solid content of 35%. The breaking strength, breaking extension and softening point of a film formed from the resin solution were 21.5 MPa, 400% and 102° C., respectively.

Referential Example 6
(Synthesis Example of Polyurea Resin for Use in a Comparative Example)

A polyurea resin solution was obtained using the same materials and formula as in Referential Example 2 except that methyliminobispropylamine was not used. This resin solution had a viscosity of 300 dPa.s (25° C.) at a solid content of 35%. The breaking strength, breaking extension and softening point of a film formed from the resin solution were 26.0 MPa, 260% and 140° C., respectively.

Referential Example 7
(Synthesis Example of Polyurethane-polyurea Resin for Use in a Comparative Example)

A polyurethane-polyurea resin solution was obtained using the same materials and formula as in Referential Example 3 except that N,N-dimethyl-N',N'-dihydroxyethyl-1,3-diaminopropane was not used. This resin solution had a viscosity of 220 dPa.s (25° C.) at a solid content of 35%. The breaking strength, breaking extension and softening point of a film formed from the resin solution were 13.0 MPa, 470% and 88° C., respectively.

Referential Example 8
(Synthesis Example of Polyamide Resin for Use in a Comparative Example)

A polyamide resin solution was obtained using the same materials and formula as in Referential Example 4 except that methyliminobispropylamine was not used. This resin solution had a viscosity of 55 dPa.s (25° C.) at a solid content of 30%. The breaking strength, breaking extension and softening point of a film formed from the resin solution were 8.0 MPa, 130% and 135° C., respectively.

The weight average molecular weights of the respective resins obtained above in Referential Examples 1–8 and the numbers of tertiary amino groups per 1,000 weight average molecular weight in the respective resins were as shown below in Table 1.

TABLE 1

| Referential Example | Weight average molecular weight | Number of tertiary amino groups |
|---|---|---|
| 1 | 87,000 | 0.67 eq/g |
| 2 | 63,000 | 0.76 eq/g |
| 3 | 69,000 | 1.23 eq/g |
| 4 | 72,000 | 0.22 eq/g |
| 5 | 84,000 | 0 |
| 6 | 70,000 | 0 |
| 7 | 65,000 | 0 |
| 8 | 74,000 | 0 |

EXAMPLES 1–4

In each Example, 40 parts of the resin obtained in the corresponding one of Referential Examples 1–4, 100 parts of fine particulate synthetic amorphous silica (BET specific surface area: 300 $m^2/g$, product of Mizusawa Industrial Chemicals, Ltd.) and 0.2 part of a dispersant (sodium polypyrophosphate) were dispersed and mixed in a methyl ethyl ketone/toluene mixed solvent, and the solid content of the resulting dispersion was adjusted to 15%. Four coating formulations according to the present invention were therefore obtained for the formation of ink-receiving layers. Each coating formulation was applied by an air knife coater on a wood-free paper sheet having a basis weight of 35 g/m² to give a solid coat weight of 10 g/m², and was then dried. The thus-coated paper sheet was supercalendered under a linear pressure of 200 Kg/cm to form an ink-receiving layer. Four recording sheets according to the present invention were therefore obtained in Examples 1–4, respectively.

Comparative Examples 1–4

In each Comparative Example, 40 parts of the resin obtained in the corresponding one of Referential Examples 5–8, 100 parts of fine particulate synthetic amorphous silica (BET specific surface area: 300 m²/g, product of Mizusawa Industrial Chemicals, Ltd.) and 0.2 part of a dispersant (sodium polypyrophosphate) were dispersed and mixed in a methyl ethyl ketone/toluene mixed solvent, and the solid content of the resulting dispersion was adjusted to 15%. Four coating formulations were therefore obtained for the formation of ink-receiving layers. Each coating formulation was applied by an air knife coater on a wood-free paper sheet having a basis weight of 35 g/m² to give a solid coat weight of 10 g/m², and was then dried. The thus-coated paper sheet was supercalendered under a linear pressure of 200 Kg/cm to form an ink-receiving layer. Four recording sheets were therefore obtained in Comparative Examples 1–4, respectively.

Using the eight (8) recording sheets obtained as described above, printing or recording was conducted with four colors of yellow, magenta, cyan and black on an ink-jet printer which was designed to perform printing or recording with inks of water-soluble dyes. The following properties were ranked. The ranking results are presented in Table 2.

Ink Absorbency

The number of seconds required until printed inks dried was counted, and ink absorbency was ranked in accordance with the following ranking standard.

A: 5 seconds or shorter.

B: 6 to 10 seconds.

C: 11 seconds or longer.

Vividness of Produced Colors

A color mark was printed by the above-described printer and the vividness of the thus-obtained color mark was then visually observed. The vividness of the produced colors was ranked in accordance with the following ranking standard.

A: Good

B: Average

C: Poor

Blotting Resistance

The extents of ink blotting and bleeding at an overprinted boundary area of magenta and cyan were visually observed. The blotting resistance was ranked in accordance with the following ranking standard.

A: Good

B: Average

C: Poor

Waterproofness of Ink-receiving Layer

Each ink-receiving layer was wetted with water. The state of separation of the ink-receiving layer upon wiping the water off under constant finger pressure was visually observed. The waterproofness of the ink-receiving layer was ranked in accordance with the following ranking standard.

A: No change.

B: Changed in surface conditions.

C: Separated.

Waterproofness of Printed Mark

After printing each recording sheet by the printer, the recording sheet was dipped for 10 minutes in water, and the recording sheet was then dried at room temperature. The recorded mark was visually observed for changes in blotting and color. The waterproofness of the printed mark was ranked in accordance with the following ranking standard.

A: No change.

B: Some color changes were observed.

C: Color changes were observed.

The resin solutions obtained in Referential Examples 1–8 were individually coated on 100-μm PET films to give a dry coat thickness of 20 μm, whereby transparent sheets were produced. In a similar manner as described above, printing or recording was conducted by the ink jet printer. Properties were ranked by the following methods, respectively.

Blocking Resistance

An untreated PET film was placed over the resin-coated side of each transparent sheet and, under a load of 0.29 MPa, the film and the sheet were left over at 40° C. for 1 day. The untreated PET film was then removed, and the blocking resistance of the transparent sheet was visually observed. The blocking resistance was ranked in accordance with the following ranking standard.

A: No blocking.

B: Slight blocking.

C: Severe blocking.

Printer Transportability

The printer transportability of each transparent sheet upon printing or recording it by the ink-jet printer was observed, and was ranked in accordance with the following ranking standard.

A: Good transportability.

B: Slight noise was produced.

C: Poor transportability.

Waterproofness of Printed Mark

After each transparent sheet was printed by the printer, the recorded sheet was dipped for 24 hours in water and was then dried at room temperature. The recorded mark was visually observed for changes in blotting and color. The waterproofness of the printed mark was ranked in accordance with the following ranking standard.

A: No change.

B: Some color changes were observed.

C: The dyes were completely dissolved, resulting in the disappearance of the mark.

TABLE 2

| Ranked properties | Example | | | | Comparative Example | | | |
|---|---|---|---|---|---|---|---|---|
| | 1 | 2 | 3 | 4 | 1 | 2 | 3 | 4 |
| Ink absorbency | A | A | A | A | A | A | A | A |
| Vividness of produced color | A | A | A | A | A | A | A | A |
| Blotting resistance | A | A | A | A | A | A | A | A |
| Waterproofness of ink-receiving layer | A | A | A | A | B | B | B | B |
| Waterproofness of printed mark (wood-free paper sheet) | A | A | A | A | B | B | B | B |

TABLE 2-continued

| | Example | | | | Comparative Example | | | |
|---|---|---|---|---|---|---|---|---|
| Ranked properties | 1 | 2 | 3 | 4 | 1 | 2 | 3 | 4 |
| Blocking resistance | A | A | A | A | C | B | C | B |
| Printer transportability | A | A | A | A | C | B | C | B |
| Waterproofness of printed mark (PET film) | A | A | A | A | C | C | C | C |

As has been described above, the first aspect of the present invention provides an ink-jet recording sheet, which gives printed marks of high quality, is excellent in the waterproofness and moisture resistance of its ink-receiving layer and printed marks, and also is excellent in the transportability and blocking resistance in a printer.

[Second Aspect of the Present Invention]

Referential Example 1
(Synthesis Example of Polyurethane Resin)

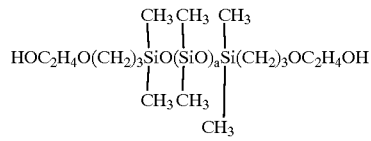

(wherein a stands for an integer to give a molecular weight of 3,200.)

In a reactor, 8 parts of a polydimethylsiloxanepolyol having the above-described structure (molecular weight: 3,200), 142 parts of polyethylene glycol (molecular weight: 2,040), 20 parts of N-methyldiethanolamine and 5 parts of diethylene glycol were dissolved in a mixed solvent consisting of 100 parts of methyl ethyl ketone and 200 parts of dimethylformamide. While thoroughly stirring the solution at 60° C., a solution of 73 parts of hydrogenated MDI in 100 parts of methyl ethyl ketone was gradually added dropwise. After completion of the dropwise addition, they were reacted at 80° C. for 6 hours. Sixty parts of methyl ethyl ketone were then added so that a polyurethane resin solution was obtained. This solution had a viscosity of 330 dPa.s (25° C.) at a solid content of 35%. The breaking strength, breaking extension and softening point of a film formed from the resin solution were 20.5 MPa, 400% and 103° C., respectively.

Referential Example 2
(Synthesis Example of Polyurea Resin)

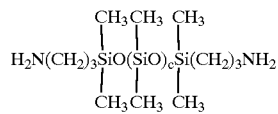

(wherein c stands for an integer to give a molecular weight of 3,880.)

In a reactor, 5 parts of a polydimethylsiloxanediamine having the above-described structure (molecular weight: 3,880), 145 parts of polyethylene oxide diamine ("Jeffermin ED", trade name; product of Texaco Chemical Inc.; molecular weight: 2,000), 25 parts of methyliminobispropylamine and 5 parts of 1,4-diaminobutane were dissolved in 250 parts of dimethylformamide. While thoroughly stirring the solution with its internal temperature controlled within a range of from 20 to 30° C., a solution of 75 parts of hydrogenated MDI in 100 parts of dimethylformamide was gradually added dropwise to react them. After completion of the dropwise addition, the internal temperature was gradually raised. When 50° C. was reached, they were reacted further for 6 hours. Dimethylforamide (125 parts) was then added so that a polyurea resin solution useful in the present invention was obtained. This resin solution had a viscosity of 315 dPa.s (25° C.) at a solid content of 35%. The breaking strength, breaking extension and softening point of a film formed from the resin solution were 31.3 MPa, 370% and 147° C., respectively.

Referential Example 3
(Synthesis Example of Polyurethane-polyurea Resin)

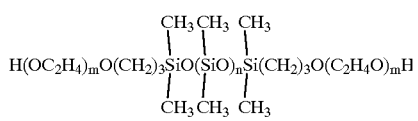

(wherein m and n stand for integers to give a molecular weight of 4,500.)

In a reactor, 5 parts of an ethylene-oxide-added polydimethylsiloxane having the above structure (molecular weight: 4,500), 145 parts of polyethylene oxide diamine ("Jeffermin ED", trade name; product of Texaco Chemical Inc.; molecular weight: 2,000), 30 parts of N,N-dimethyl-N',N'-dihydroxyethyl-1,3-diaminopropane and 5 parts of dimethylformamide were dissolved in a mixed solvent consisting of 150 parts of methyl ethyl ketone and 150 parts of dimethylformamide. While thoroughly stirring the solution at 60° C., a solution of 72 parts of hydrogenated MDI in 100 parts of methyl ethyl ketone was gradually added dropwise. After completion of the dropwise addition, the contents were allowed to react at 80° C. for 6 hours. After completion of the reaction, 75 parts of methyl ethyl ketone were added so that a polyurethane-polyurea resin solution useful in the present invention was obtained. The resin solution had a viscosity of 390 dPa.s (25° C.) at a solid content of 35%. The breaking strength, breaking extension and softening point of a film formed from the resin solution were 22.7 MPa, 450% and 127° C., respectively.

Referential Example 4
(Synthesis Example of Polyamide Resin)

To a solution of 14.6 parts of adipic acid in 200 parts of anhydrous ethanol in a reactor, a solution of 11.6 parts of the polydimethylsiloxanediamine of Referential Example 2, 114 parts of polyethylene oxide diamine ("Jeffermin ED", trade name; product of Texaco Chemical Inc.; molecular weight: 2,000) and 6 parts of methyliminobispropylamine in 100 parts of anhydrous ethanol was added at room temperature. After exotherm subsided, the reaction mixture was cooled, whereby a nylon salt was allowed to precipitate.

After the nylon salt was collected by filtration and dried, 160 parts of the nylon salt were dissolved in 40 parts of water. The resulting solution was placed in an autoclave. The autoclave was purged with nitrogen gas, and its valve was closed. When the internal temperature and pressure reached 220° C. and 1.5 MPa, respectively, the valve was opened to release water vapor. Heating was continued while maintaining the pressure. Polycondensation was conducted for 4 hours and, after that, the internal pressure was allowed to slowly drop to atmospheric pressure. After the contents were cooled, the reaction product was taken out and dissolved in N-methyl-2-pyrrolidone. This resin solution had a viscosity of 42 dPa.s (25° C.) at a solid content of 30%. The breaking strength, breaking extension and softening point of a film formed from the resin solution were 6.8 MPa, 135% and 137° C., respectively.

Referential Example 5

(Synthesis Example of Polyurethane Resin for Use in a Comparative Example)

A polyurethane resin solution was obtained using the same materials and formula as in Referential Example 1 except that polydimethylsiloxane polyol and N-methyldiethanolamine were not used. This resin solution had a viscosity of 500 dPa.s (25° C.) at a solid content of 35%. The breaking strength, breaking extension and softening point of a film formed from the resin solution were 6.8 MPa, 250% and 106° C., respectively.

Referential Example 6

(Synthesis Example of Polyurea Resin for Use in a Comparative Example)

A polyurea resin solution was obtained using the same materials and formula as in Referential Example 2 except that polydimethylsiloxanediamine and methyliminobispropylamine were not used. This resin solution had a viscosity of 300 dPa.s (25° C.) at a solid content of 35%. The breaking strength, breaking extension and softening point of a film formed from the resin solution were 28.0 MPa, 300% and 144° C., respectively.

Referential Example 7

(Synthesis Example of Polyurethane-polyurea Resin for Use in a Comparative Example)

A polyurethane-polyurea resin solution was obtained using the same materials and formula as in Referential Example 3 except that polydimethylsiloxane and N,N-dimethyl-N',N'-dihydroxyethyl-1,3-diaminopropane were not used. This resin solution had a viscosity of 220 dPa.s (25° C.) at a solid content of 35%. The breaking strength, breaking extension and softening point of a film formed from the resin solution were 15.0 MPa, 430% and 88° C., respectively.

Referential Example 8

(Synthesis Example of Polyamide Resin for Use in a Comparative Example)

A polyamide resin solution was obtained using the same materials and formula as in Referential Example 4 except that polydimethylsiloxanediamine and methyliminobispropylamine were not used. This resin solution had a viscosity of 55 dPa.s (25° C.) at a solid content of 30%. The breaking strength, breaking extension and softening point of a film formed from the resin solution were 8.0 MPa, 130% and 138° C., respectively.

The weight average molecular weights of the respective resins obtained above in Referential Examples 1–8 and the numbers of tertiary amino groups per 1,000 weight average molecular weight in the respective resins were as shown below in Table 3.

TABLE 3

| Referential Example | Weight average molecular weight | Number of tertiary amino groups | Content of polysiloxane segments |
|---|---|---|---|
| 1 | 75,000 | 0.66 eq/g | 3.2% |
| 2 | 71,000 | 0.75 eq/g | 2.0% |
| 3 | 77,000 | 1.22 eq/g | 1.2% |
| 4 | 67,000 | 0.22 eq/g | 7.5% |
| 5 | 84,000 | 0 | 0 |
| 6 | 70,000 | 0 | 0 |
| 7 | 65,000 | 0 | 0 |
| 8 | 74,000 | 0 | 0 |

EXAMPLES 1–4

In each Example, 40 parts of the resin obtained in the corresponding one of Referential Examples 1–4, 100 parts of fine particulate synthetic amorphous silica (BET specific surface area: 300 m$^2$/g, product of Mizusawa Industrial Chemicals, Ltd.) and 0.2 part of a dispersant (sodium polypyrophosphate) were dispersed and mixed in a methyl ethyl ketone/toluene mixed solvent, and the solid content of the resulting dispersion was adjusted to 15%. Four coating formulations were therefore obtained for the formation of ink-receiving layers. Each coating formulation was applied by an air knife coater on a wood-free paper sheet having a basis weight of 35 g/m$^2$ to give a solid coat weight of 10 g/m$^2$, and was then dried. The thus-coated paper sheet was supercalendered under a linear pressure of 200 Kg/cm to form an ink-receiving layer. Four recording sheets according to the present invention were therefore obtained in Examples 1–4, respectively.

Comparative Examples 1–4

In each Comparative Example, 40 parts of the resin obtained in the corresponding one of Referential Examples 5–8, 100 parts of fine particulate synthetic amorphous silica (BET specific surface area: 300 m$^2$/g, product of Mizusawa Industrial Chemicals, Ltd.) and 0.2 part of a dispersant (sodium polypyrophosphate) were dispersed and mixed in a methyl ethyl ketone/toluene mixed solvent, and the solid content of the resulting dispersion was adjusted to 15%. Four coating formulations were therefore obtained for the formation of ink-receiving layers. Each coating formulation was applied by an air knife coater on a wood-free paper sheet having a basis weight of 35 g/m$^2$ to give a solid coat weight of 10 g/m$^2$, and was then dried. The thus-coated paper sheet was supercalendered under a linear pressure of 200 Kg/cm to form an ink-receiving layer. Four recording sheets were therefore obtained in Comparative Examples 1–4, respectively.

Using the eight (8) recording sheets obtained as described above, their properties were ranked by the same methods as in the first aspect of the present invention. Ranking results are presented in Table 4.

TABLE 4

|  | Example | | | | Comparative Example | | | |
|---|---|---|---|---|---|---|---|---|
| Ranked properties | 1 | 2 | 3 | 4 | 1 | 2 | 3 | 4 |
| Ink absorbency | A | A | A | A | A | A | A | A |
| Vividness of produced color | A | A | A | A | A | A | A | A |
| Blotting resistance | A | A | A | A | A | A | A | A |
| Waterproofness of ink-receiving layer | A | A | A | A | B | B | B | B |
| Waterproofness of printed mark (wood-free paper sheet) | A | A | A | A | B | B | B | B |
| Blocking resistance | A | A | A | A | C | B | C | B |
| Printer transportability | A | A | A | A | B | B | C | B |
| Waterproofness of printed mark (PET film) | A | A | A | A | C | C | C | C |

As has been described above, the second aspect of the present invention provides an ink-jet recording sheet, which gives printed marks of high quality, is excellent in the waterproofness and moisture resistance of its ink-receiving layer and printed marks, and also is excellent in the transportability and blocking resistance in a printer.

As has been described above, the formation of an ink-receiving layer of an ink-jet recording sheet with a hydrophilic resin containing tertiary amino groups in its molecule or a hydrophilic resin containing tertiary amino groups and polysiloxane segments in its molecule, most preferably with a hydrophilic polyurethane resin, hydrophilic polyurea resin, hydrophilic polyurethane-polyurea resin or hydrophilic polyamide resin as a component makes it possible to provide a recording sheet which is excellent in ink absorbency and color-producing ability, gives stable printed marks of high quality, imparts superb waterproofness and moisture resistance to the ink-receiving layer and the printed marks, and is also excellent in the transportability and blocking resistance in a printer.

What is claimed is:

1. An ink-jet recording sheet provided with at least one ink-receiving layer on at least one side of a base material sheet, wherein a resin component which constitutes said ink-receiving layer comprises a hydrophilic resin containing tertiary amino groups and polysiloxane segments in a molecule thereof, wherein said hydrophilic resin has a weight average molecular weight of from 5,000 to 500,000.

2. An ink-jet recording sheet according to claim 1, wherein said hydrophilic resin is at least one resin selected from group consisting of hydrophilic polyurethane resins, hydrophilic polyurea resins, hydrophilic polyurethane-polyurea resins and hydrophilic polyamide resins.

3. An ink-jet recording sheet according to claim 2, wherein said hydrophilic resin is a polyurethane resin.

4. An ink-jet recording sheet according to claim 2, wherein said hydrophilic resin is a polyurea resin.

5. An ink-jet recording sheet according to claim 2, wherein said hydrophilic resin is a polyurethane-polyurea resin.

6. An ink-jet recording sheet according to claim 2, wherein said hydrophilic resin is a polyamide resin.

7. An ink-jet recording sheet according to claim 1, wherein said hydrophilic resin has a weight average molecular weight of from 10,000 to 200,000.

8. An ink-jet recording sheet according to claim 7, wherein said base material sheet is made of plastics, glass, fabric, leather, wood, metal or paper.

9. An ink-jet recording sheet according to claim 1, wherein said base material sheet is made of plastics, glass, fabric, leather, wood, metal or paper.

10. An ink-jet recording sheet provided with at least one ink-receiving layer on at least one side of a base material sheet, wherein a resin component which constitutes said ink-receiving layer comprises a hydrophilic resin containing tertiary amino groups and polysiloxane segments in a molecule thereof, wherein said hydrophilic resin contains tertiary amino groups in a proportion of from 0.1 to 50 equivalents per grams.

11. An ink-jet recording sheet according to claim 10, wherein said base material sheet is made of plastics, glass, fabric, leather, wood, metal or paper.

12. An ink-jet recording sheet according to claim 10, wherein said hydrophilic resin contains tertiary amino groups in a proportion of from 0.2 to 10.0 equivalents per gram.

13. An ink-jet recording sheet according to claim 12, wherein said base material sheet is made of plastics, glass, fabric, leather, wood, metal or paper.

14. An ink-jet recording sheet provided with at least one ink-receiving layer on at least one side of a base material sheet, wherein a resin component which constitutes said ink-receiving layer comprises a hydrophilic resin containing tertiary amino groups and polysiloxane segments in a molecule thereof, wherein said hydrophilic resin contains polysiloxane segments at a content of from 0.1 to 10 wt. %.

15. An ink-jet recording sheet according to claim 14, wherein said base material sheet is made of plastics, glass, fabric, leather, wood, metal or paper.

16. An ink-jet recording sheet according to claim 14, wherein said hydrophilic resin contains polysiloxane segments at a content of from 0.5 to 10 wt. %.

17. An ink-jet recording sheet according to claim 16, wherein said base material sheet is made of plastics, glass, fabric, leather, wood, metal or paper.

* * * * *